United States Patent
Cai et al.

(10) Patent No.: US 10,580,150 B2
(45) Date of Patent: Mar. 3, 2020

(54) METHOD FOR IMPROVING CALCULATIONS OF SURFACE ROUGHNESS

(71) Applicant: Macau University of Science and Technology, Macau (CN)

(72) Inventors: Zhanchuan Cai, Macau (CN); Wei Cao, Macau (CN)

(73) Assignee: Macau University of Science and Technology, Macau (CN)

( * ) Notice: Subject to any disclaimer, the term of this patent is extended or adjusted under 35 U.S.C. 154(b) by 195 days.

(21) Appl. No.: 15/894,956

(22) Filed: Feb. 13, 2018

(65) Prior Publication Data

US 2019/0251697 A1    Aug. 15, 2019

(51) Int. Cl.
| | |
|---|---|
| G06T 7/44 | (2017.01) |
| G06T 17/05 | (2011.01) |
| G06F 17/16 | (2006.01) |
| G06F 17/11 | (2006.01) |

(52) U.S. Cl.
CPC ............. *G06T 7/44* (2017.01); *G06F 17/11* (2013.01); *G06F 17/16* (2013.01); *G06T 17/05* (2013.01); *G06T 2207/10032* (2013.01); *G06T 2207/20021* (2013.01); *G06T 2207/30181* (2013.01)

(58) Field of Classification Search
None
See application file for complete search history.

(56) References Cited

U.S. PATENT DOCUMENTS

| | | | | |
|---|---|---|---|---|
| 2013/0064467 | A1* | 3/2013 | Abraham | G01S 7/295 382/254 |
| 2019/0110739 | A1* | 4/2019 | Tey | A61B 5/442 |

OTHER PUBLICATIONS

Cao W, Cai Z, Ye B. Measuring Multiresolution Surface Roughness Using V-System. IEEE Transactions on Geoscience and Remote Sensing. Nov. 14, 2017;56(3):1497-506. (Year: 2017).*
Capraro, Christopher T., et al. "Implementing digital terrain data in knowledge-aided space-time adaptive processing." IEEE Transactions on Aerospace and Electronic Systems 42.3 (2006): 1080-1099. (Year: 2006).*
Tanaka, Mitsuru, Kazuhiro Arimitsu, and Kenichi Sato. "Electromagnetic characterization of rough-surface profile using conjugate gradient method." Proceedings of IGARSS'93-IEEE International Geoscience and Remote Sensing Symposium. IEEE, 1993. (Year: 1993).*
Cohanim, Babak E., Jeffrey A. Hoffman, and Tye Brady. "Hazard detection for small robotic landers and hoppers." 2013 IEEE Aerospace Conference. IEEE, 2013. (Year: 2013).*
(Continued)

*Primary Examiner* — Michelle M Entezari
(74) *Attorney, Agent, or Firm* — Eagle IP Limited; Jacqueline C. Lui

(57) ABSTRACT

Example embodiments include a method that improves calculations of surface roughness that map a planetary surface. The method includes calculating a V-system matrix with a size of $\alpha \times \alpha$ in an interval [0,1]; transforming the V-system matrix into an orthogonal matrix; improving calculations of the surface roughness of the planetary surface by calculating the surface roughness of a digital elevation model generated from data captured from the planetary surface; and generating a map of the planetary surface based on the surface roughness.

20 Claims, 16 Drawing Sheets
(4 of 16 Drawing Sheet(s) Filed in Color)

(56) References Cited

OTHER PUBLICATIONS

A. Ryan, and H. Lewis, "Effect of surface roughness on paper substrate circuit board," IEEE Transactions on Components, Packaging and Manufacturing Technology, vol. 2, No. 7, pp. 1202-1208, 2012.

C. H. Grohmann, M. J. Smith, and C. Riccomini, "Surface roughness of topography: A multi-scale analysis of landform elements in midland valley, Scotland," in Proceedings of Geomorphology, Zunrich, Switzerland, pp. 140-148, 2009.

E. Hewitt, and R. E. Hewitt, "The gibbs-wilbraham phenomenon: An episode in fourier analysis," Archive for history of Exact Sciences, vol. 21, No. 2, pp. 129-160, 1979.

M. A. Rosenburg, O. Aharonson, J. W. Head, M. A. Kreslaysky, E M. Mazarico, G. A. Neumann, D. E. Smith, M. H. Torrence, and M. T. Zuber, "Global surface slopes and roughness of the moon from the Lunar Orbiter Laser Altimeter," Journal of Geophysical Research: Planets, vol. 116, No. E02001, 2011.

N. Fardin, O. Stephansson, and L. Jing, "The scale dependence of rock joint surface roughness," International Journal of Rock Mechanics and Mining Sciences, vol. 38, No. 5, pp. 659-669, 2001.

W. G. Rees, and N. S. Arnold, "Scale-dependent roughness of a glacier surface: implications for radar backscatter and aerodynamic roughness modelling," Journal of Glaciology, vol. 52, No. 177, pp. 214-222, 2006.

E. E. Brodsky, J. D. Kirkpatrick, and T. Candela, "Constraints from fault roughness on the scale-denpendent strength of rocks," Geology, vol. 44, No. 1, pp. 19-22, 2016.

R. W. K. Potter, D. A. Kring, G. S. Collins, W. S. Kiefer, and P. J. McGovern, "Numerical modeling of the formation and structure of the orientale impact basin," Journal of Geophysical Research: Planets, vol. 118, No. 5 pp. 963-979, 2013.

A. L. Nahm, T. Ö hman, and D. A. Kring, "Normal faulting origin for the Cordillera and Outer Rook Rings of Orientale basin, the Moon," Journal of Geophysical Research: Planets, vol. 118, No. 2 pp. 190-205, 2013.

M. A. Kreslaysky, J. W. Head, G. A. Neumann, M. A. Rosenburg, O. Aharonson, D. E. Smith, and M. T. Zuber, "Lunar topographic roughness maps from Lunar Orbiter Laser Altimeter (LOLA) data: Scale dependence and correlation with geologic features and units," Icarus, vol. 226, No. 1, pp. 52-66, 2013.

* cited by examiner

100

```
┌─────────────────────────────────────────────────────┐
│ Calculating a V-system matrix with a size of α x α  │
│ in an interval [0,1] such that the interval [0,1]   │
│ is divided into α parts, wherein the V-system       │
│ matrix is calculated by an integral operation based │
│ on a V-system basis function Vt(x)                  │
│                         102                         │
└─────────────────────────────────────────────────────┘
                           ↓
┌─────────────────────────────────────────────────────┐
│ transforming the V-system matrix into an orthogonal │
│ matrix (P(x))                                       │
│                         104                         │
└─────────────────────────────────────────────────────┘
                           ↓
┌─────────────────────────────────────────────────────┐
│ improving calculations of the surface roughness (R) │
│ of a planetary surface by calculating the surface   │
│ roughness (R) of a digital elevation model (F(y))   │
│ generated from data captured from the planetary     │
│ surface, wherein (R) is expressed as:               │
│                                                     │
│           R = P(x) × F(y) × P(x)'                   │
│                         106                         │
└─────────────────────────────────────────────────────┘
                           ↓
┌─────────────────────────────────────────────────────┐
│ generating an improved map of the planetary surface │
│ based on the surface roughness (R)                  │
│                         108                         │
└─────────────────────────────────────────────────────┘
```

Figure 1

```
Algorithm 1 V1-transform algorithm Part 1
input: matrix size : a
output: V – system matrix : P
 1:  k ← 1
 2:  V ← V1-TRANSFORM(i, j, k, n)
 3:  for t = 1 to a do
 4:      for x = 0 to 1 do
 5:          $I_t(x) = \int_{\frac{i-1}{a}}^{\frac{i}{a}} V_t(x)dx$;
 6:          $P(x) \leftarrow <I(x), I(x)>$.
 7:      end for
 8:  end for
 9:  function V1-TRANSFORM(i, j, k, n)
10:      while n < 3 do
11:          if i = 1 and n = 1 then
12:              while x ∈ [0, 1) do
13:                  $V_{1,1}^1(x) = 1$
14:              end while
15:          else
16:              if i = 1 and n = 2 then
17:                  while $x \in [0, \frac{1}{2})$ do
18:                      $V_{1,2}^1(x) = \sqrt{3}(1 - 4x)$
19:                  end while
20:                  while $x \in [\frac{1}{2}, 1)$ do
21:                      $V_{1,2}^1(x) = \sqrt{3}(4x - 1)$
22:                  end while
23:              else
24:                  if i = 2 and n = 1 then
25:                      while $x \in [\frac{1}{2}, 1)$ do
26:                          $V_{1,1}^2(x) = \sqrt{3}(1 - 2x)$
27:                      end while
28:                  else
29:                      if i = 2 and n = 2 then
30:                          while $x \in [0, \frac{1}{2})$ do
31:                              $V_{1,2}^2(x) = 1 - 6x$
32:                          end while
33:                          while $x \in [\frac{1}{2}, 1)$ do
34:                              $V_{1,2}^2(x) = 5 - 6x$
35:                          end while
36:                      end if
37:                  end if
38:              end if
39:          end if
40:      end while
41:      ▷ For some reasons we need to break here!
```

Algorithm 1 V1-transform algorithm Part 2

42:     while $n \geq 3$ do
43:          $j = 1, 2, \cdots, 2^{n-2}$, and $n = 3, 4, \cdots$
44:          while $x \in (\frac{j-1}{2^{n-2}}, \frac{j}{2^{n-2}})$ do
45:              $V_{1,n}^{1,j}(x) = \sqrt{2^{n-2}} V_{1,2}^{1}[2^{n-2}(x - \frac{j-1}{2^{n-2}})]$
46:              $V_{1,n}^{2,j}(x) = \sqrt{2^{n-2}} V_{1,2}^{2}[2^{n-2}(x - \frac{j-1}{2^{n-2}})]$
47:          end while
48:          while $x \notin (\frac{j-1}{2^{n-2}}, \frac{j}{2^{n-2}})$ do
49:              $V_{1,n}^{1,j}(x) = 0$
50:              $V_{1,n}^{2,j}(x) = 0$
51:          end while
52:      end while
53: end function

TABLE II
RMSE OF SURFACE ROUGHNESS PROPERTIES FOR LUNAR TOPOGRAPHY

|  | V-system | 57m slope |
|---|---|---|
| Whole | 0.3489 | 0.3478 |
| Maria(Nearside) | 0.2946 | 0.3017 |
| Highlands(Farside) | 0.3947 | 0.3688 |

TABLE III
LIST OF DIFFERENT STATISTICAL PARAMETERS OF SURFACE ROUGHNESS AT MULTIRESOLUTIONS

| Maria | 4 pixels/degree | 8 pixels/degree | 16 pixels/degree |
|---|---|---|---|
| RMSE | 0.13 | 0.10 | 0.07 |
| Median value | 0.09 | 0.06 | 0.04 |
| Highland | 4 pixels/degree | 8 pixels/degree | 16 pixels/degree |
| RMSE | 0.22 | 0.16 | 0.12 |
| Median value | 0.20 | 0.14 | 0.09 |

Figure 11

METHOD FOR IMPROVING CALCULATIONS OF SURFACE ROUGHNESS

FIELD OF THE INVENTION

The present invention relates to methods and apparatus for generating maps and in particular improved maps.

BACKGROUND

Remote sensed data provides a huge number of elevations for representing the planetary surface. Properties of surface textures are crucial to analyze surface features, which are important in various types of applications. As a common land-surface parameter, surface roughness plays an important role in describing the waviness of surface textures. New methods and apparatus that assist in advancing technological needs and industrial applications in effective computation for generating improved surface roughness maps are desirable.

SUMMARY OF THE INVENTION

One example embodiment is a method that improves calculations of surface roughness that map a planetary surface. The method includes calculating a V-system matrix with a size of $\alpha \times \alpha$ in an interval [0,1] such that the interval [0,1] is divided into a parts; transforming the V-system matrix into an orthogonal matrix; improving calculations of the surface roughness of the planetary surface by calculating the surface roughness of a digital elevation model generated from data captured from the planetary surface; and generating a map of the planetary surface based on the surface roughness.

Another example embodiment is a computer system that reduces central processing unit (CPU) time to process instructions that generate a surface roughness map. The computer system includes a processor, a display and a non-transitory computer-readable medium. The non-transitory computer-readable medium has instructions stored therein that when executed cause the processor to calculate a V-system matrix with a size of $\alpha \times \alpha$ in an interval [0,1] such that the interval [0,1] is divided into a parts; transform the V-system matrix into an orthogonal matrix (P(x)); reduce CPU time by calculating a surface roughness (R) for a digital elevation model (F (y)) and generate the surface roughness map by characterizing map values with color on the display based on the surface roughness (R).

Another example embodiment is a method that generates an improved map showing surface roughness of a planetary surface. The method includes calculating, by a computer, a V-system matrix with a size of $\alpha \times \alpha$ in an interval [0,1] such that the interval [0,1] is divided into a parts; transforming, by the computer system, the V-system matrix into an orthogonal matrix (P(x)); and generating the improved map of the surface roughness of the planetary surface by calculating a surface roughness (R) of a digital elevation model (F (y)) generated from data captured from the planetary surface.

Other example embodiments are discussed herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 shows a method that improves calculations of surface roughness that map a planetary surface in accordance with an example embodiment.

FIG. 7 shows a first part of pseudo code for calculating a V-system matrix in accordance with an example embodiment.

FIG. 8 shows a second part of the pseudo code in FIG. 7 in accordance with an example embodiment.

FIG. 10 shows Root-mean-square-error (RMSE) of surface roughness properties for lunar topography with 57 m median absolute slope and with the method executed in accordance with an example embodiment.

FIG. 11 shows the statistical results of surface properties in nearside terrains (Maria) and farside terrains (Highlands) at multiresolution in different statistical parameters in accordance with an example embodiment.

Figure 16:
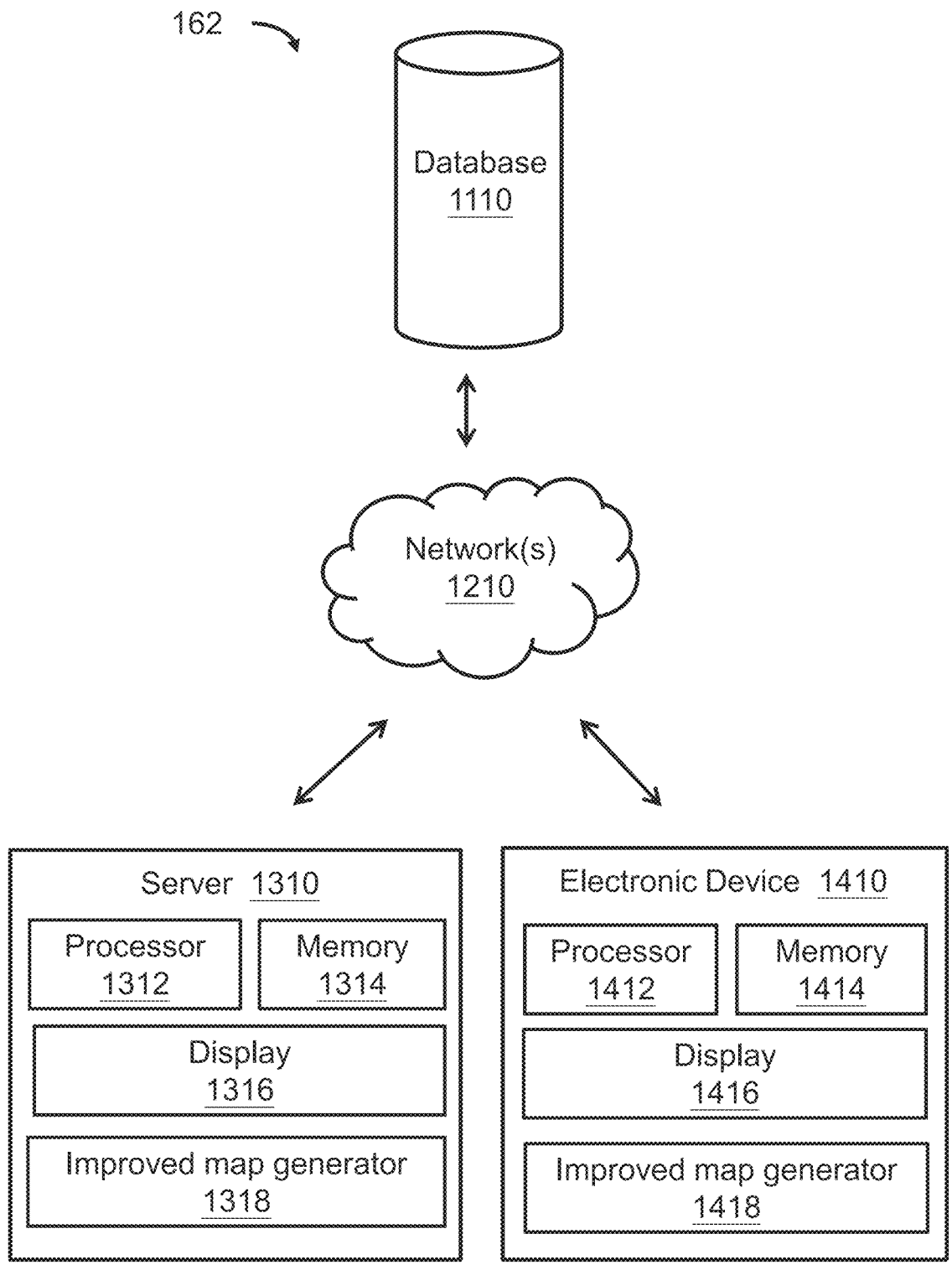

FIG. 16 shows a computer system reduces central processing unit (CPU) time to process instructions that generates a surface roughness map in accordance with an example embodiment.

DETAILED DESCRIPTION

Example embodiments relate to apparatus and methods that improve calculations of surface roughness that map a planetary surface.

A single, practical definition of surface roughness does not exist. Conventionally, surface roughness is defined as some gradient-based parameters. These parameters utilize typical elevation variations to characterize surface features. For example, the deviations in substrate surface is utilized to create interference patterns for calculating the roughness. Furthermore, the gradient-based measures are widely used in different geological studies. For example, surface roughness is defined by several parameters, including the RMS height, correlation length and the form of autocorrelation function for microwave scattering analysis from sea ice. Root mean square slope is defined as the average square of the difference between elevations and the mean elevation of remote sensed data. For the analysis of silicon direct bonding, surface roughness is modeled and defined by a Gaussian distribution. However, the gradient-based parameters only use limited points in source data and cannot provide an accurate quantification because most of the measures are sensitive to the local mean value $\bar{z}$. If source data have negative numbers, some deep-concave terrains, such as bowl-shape craters, sometimes show higher roughness values than those in rough highlands.

Also, conventional methods are not suitable for usages in digital elevation models (DEMs). Most of them can only be used in the spatial remote sensed data for fixed requirements. Conventional methods cannot provide a complete mathematical description of surface information of DEMs. On the other hand, roughness maps should help the geologists to focus upon the typical surface characteristics. A roughness measure should be helpful to highlight the prominent waviness of surface textures, but the local highest or most distinguishable deviations between the data points is not enough to reflect these wavy variations. The low-wavy profiles sometimes also indicate rough morphologies, such as the chaotic terrains on planetary surface. However, conventional methods cannot show these roughness variations because only several points in source data are used for roughness calculation.

Figure 2:
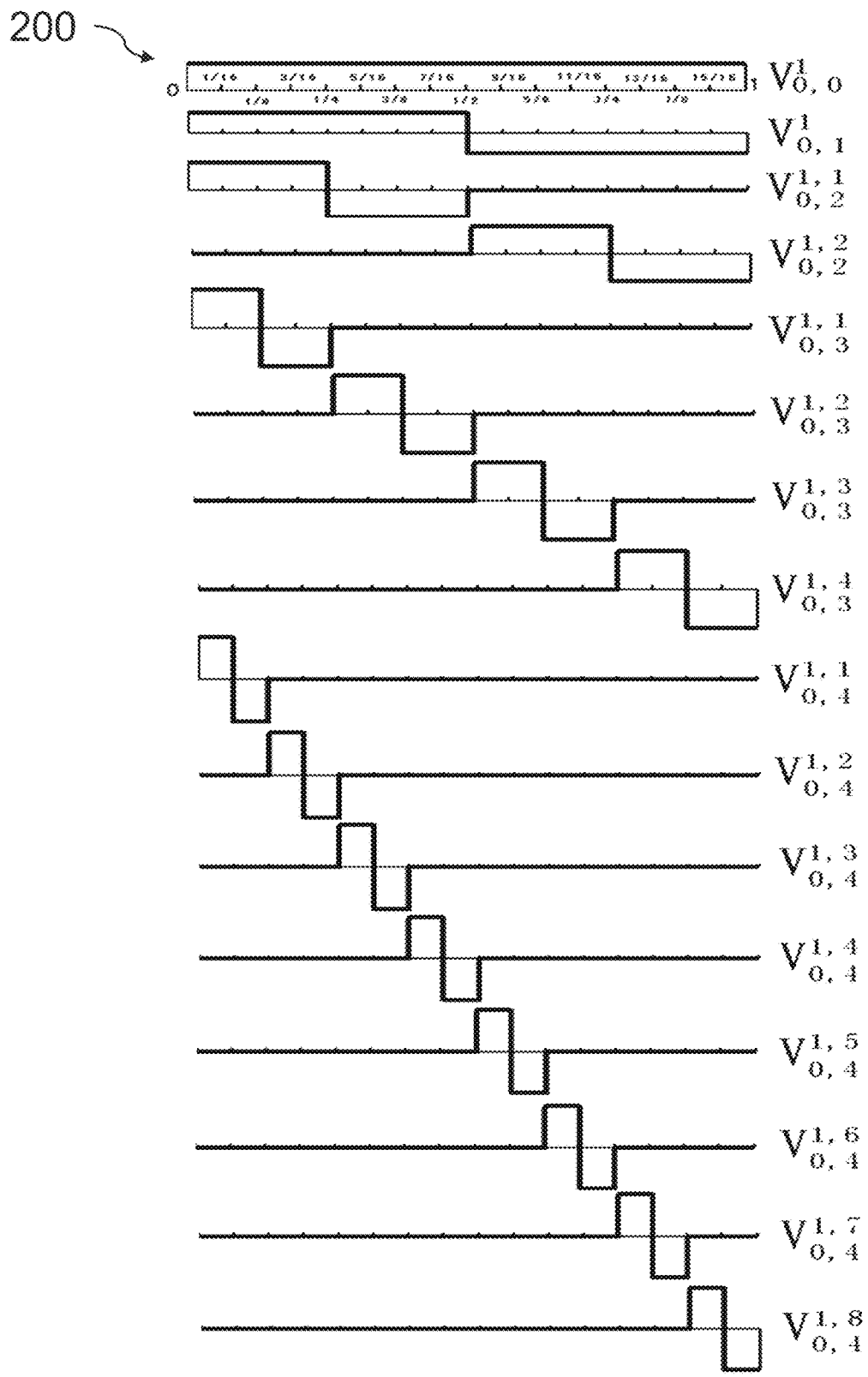
FIG. 2 shows basis functions of the V-system of degree k=0 in accordance with an example embodiment.
Figure 3:
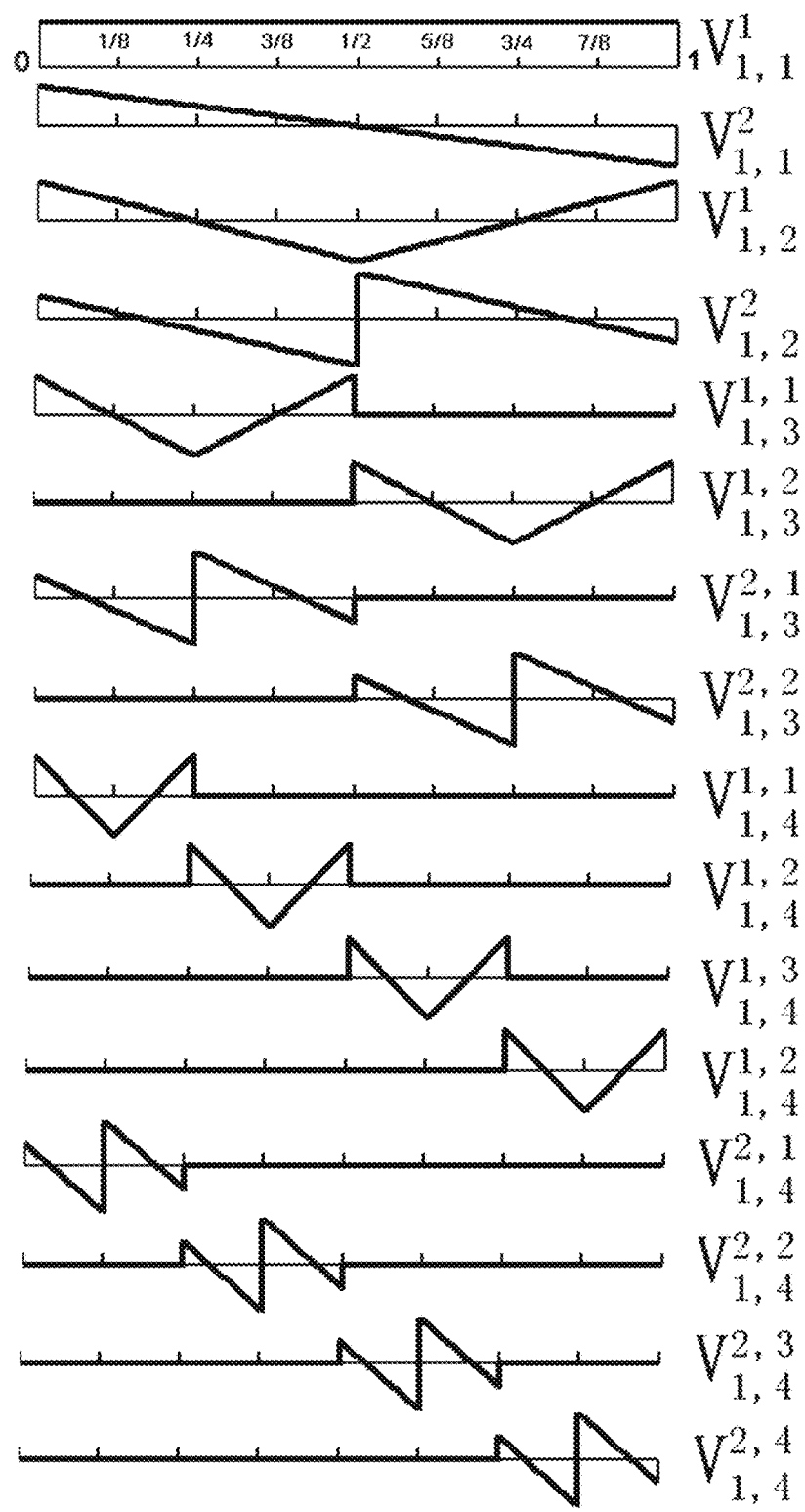
FIG. 3 shows basis functions of the V-system of degree k=1 in accordance with an example embodiment.

Fourier transform has wide usages in geological studies. However, Fourier parameters can only be approximated by using finite numbers of Fourier coefficients. If the Fourier series has the discontinued points, Gibbs phenomenon occurs. The Gibbs phenomenon shows the fact that Fourier sums overshoot at a jump discontinuity in the fractured structures of terrains. For example, as shown in FIG. 2, the jump discontinuities can be seen clearly in the Fourier series of the square wave. As a consequence, the Gibbs phenomenon makes unreasonable Fourier values. These values cannot reflect the real surface waviness. As an effective robust algorithm for discrete system, wavelet transform is a tool for determining and identifying surface roughness parameters. However, the wavelet transform cannot avoid Gibbs phenomenon in the wavelet reconstruction. Haar wavelet, as shown in FIG. 3, is one of the complete orthogonal systems and can indicate the multiresolution capability of the discrete system without Gibbs phenomenon because it uses both continuous and discontinuous functions to characterize the most topographic variations on the surface. Nevertheless, Haar wavelet takes the values −1, 0, and 1 only. V-system is an orthogonal expansion of Haar wavelet and it can characterize more complicated morphological variations based on its various functions.

One or more example embodiments solve the above-stated problems or difficulties by providing new methods and apparatus that improve or facilitate the computation of surface roughness that map a terrain surface, e.g. a planetary surface.

Example embodiments include a method that involves a V-system algorithm for roughness mapping. The scale-dependence of surface roughness is reflected by the different sizes of orthogonal matrixes.

Example embodiments provide a roughness measure for the broad area on the quantification of surface textures using DEMs. DEMs provide an objective overview of global topography. The development of remote sensed equipment, such as Mars Orbiter Laser Altimeter, SRTM DEM, ASTER GDEM and the Lunar Orbiter Laser Altimeter (LOLA), brings huge number of elevations to ensure the high-resolution wide availability. In order to quantify surface roughness significantly by using high-resolution DEMs, example embodiments involve a discrete V-system algorithm.

Example embodiments provide a definition of surface roughness that ensures the resulting maps can indicate the multiresolution properties of surfaces. Furthermore, the major surface characteristics can be quantified accurately because the V-system utilize the continuous and discontinuous functions to characterize the major and subtle roughness variations. Finally, the roughness textural jump discontinuities in heavily fractured terrains can be avoided because V-system use specific functions to remove the effect of Gibbs phenomenon, which occurs in the roughness constructions of fractured terrains and in the case that roughness textures change abnormally.

Example embodiments have advantages over other wavelets that include characterization of morphological variations based on multiresolution properties; and directly processing of source data by V-system functions with simple operations and reduced computational time.

Example embodiments also provide improved methods for calculating surface roughness over conventional methods. In one example embodiment, a method is executed by a computer system that improves calculations of surface roughness (R) that map a planetary surface. A V-system matrix is calculated with a size of $\alpha \times \alpha$ in an interval [0,1]. The V-system matrix is transformed into an orthogonal matrix (P(x)). Calculations of the surface roughness (R) of the planetary surface is improved by calculating the surface roughness (R) of a digital elevation model (F (y)) generated from data captured from the planetary surface. An improved map of the planetary surface is generated based on the surface roughness (R).

Another example embodiment includes a computer system that reduces central processing unit (CPU) time to process instructions that generate a surface roughness map. This enables surface roughness to be calculated more quickly with less computer processing resources. The computer system includes a processor, a display and a non-transitory computer-readable medium having stored therein instructions that when executed cause the processor to calculate a V-system matrix with a size of $\alpha \times \alpha$ in an interval [0,1] such that the interval [0,1] is divided into a parts; transform the V-system matrix into an orthogonal matrix (P(x)); reduce CPU time by calculating a surface roughness (R) for a digital elevation model (F (y)); and generate the surface roughness map by characterizing map values with color on the display based on the surface roughness (R).

By way of example, the V-system matrix is calculated by the integral operation based on the V-system basis function $V_t(x)$, x is a variable in the interval [0,1]. t is a number of each part in the V-system matrix and t=1, 2, . . . , α, α is the total number of the functions in the V-system.

By way of example, (R) is expressed as:

$$R = P(x) \times F(y) \times P(x)'$$

where P (x) is used as a moving window sliding over the digital elevation model, P(x)' is the conjugate transpose of P(x), and y denotes elevations in the digital elevation model. R obtained is denoted by {R(1,1), R(1,2), . . . , R(i,j), . . . , R(n,n)}, where n is the total number of the function in the V-system.

By way of example, to quantify the roughness value ($R_0$), the absolute mean value of R is used as the definition of the V-system roughness:

$$R_0 = \frac{1}{\alpha \times \alpha}\left(\sum_{i=1}^{\alpha}\sum_{j=1}^{\alpha}|R(i,j)| - |R(1,1)|\right)$$

By way of example, the computer system includes a mapper that connects with a remote sensing device, wherein the mapper collects data of a terrain's surface from the remote sensing device and generates the digital elevation model.

By way of example, the V-system matrix is transformed into the orthogonal matrix by a Gram-Schmidt process.

By way of example, the instructions in the computer system when executed further cause the processor to compute a V-system of degree 1, wherein the V-system of degree 1 is divided in n group and is defined as:

$$V_{1,1}^1(x) = 1, x \in [0, 1]$$

$$V_{1,1}^2(x) = \sqrt{3}(1 - 2x), x \in [0, 1]$$

$$V_{1,2}^1(x) = \begin{cases} \sqrt{3}(1-4x), & x \in \left(0, \frac{1}{2}\right), \\ \sqrt{3}(4x-1), & x \in \left(\frac{1}{2}, 1\right), \end{cases}$$

$$V_{1,2}^2(x) = \begin{cases} 1-6x, & x \in \left(0, \frac{1}{2}\right), \\ 5-6x, & x \in \left(\frac{1}{2}, 1\right). \end{cases}$$

where n<3.

By way of example, the instructions in the computer system when executed further cause the processor to compute a V-system of degree 1, wherein the V-system of degree 1 is divided in n group and is defined as:

$$V_{1,n}^{1,j}(x) = \begin{cases} \sqrt{2^{n-1}}\, V_{1,2}^1\left[2^{n-2}\left(x - \frac{j-1}{2^{n-2}}\right)\right], & x \in \left(\frac{j-1}{2^{n-2}}, \frac{j}{2^{n-2}}\right) \\ 0 & \text{others}. \end{cases}$$

$$V_{1,n}^{2,j}(x) = \begin{cases} \sqrt{2^{n-2}}\, V_{1,2}^2\left[2^{n-2}\left(x - \frac{j-1}{2^{n-2}}\right)\right], & x \in \left(\frac{j-1}{2^{n-2}}, \frac{j}{2^{n-2}}\right) \\ 0 & \text{others}. \end{cases}$$

where $$j = 1, 2, \ldots, 2^{n-2},$$

and $$n = 3, 4, \ldots .$$

By way of example, the digital elevation model has a resolution selected from a group consisting of 4, 8 and 16 pixels/degree.

Example embodiments also include methods that generate improved surface roughness maps over conventional maps. One or more example embodiments include a method that generates an improved map showing surface roughness of a planetary surface on a display. The method is implemented based on a complete orthogonal V-system. Based on the continuous and discontinuous functions in V-system, the V-system roughness can not only characterize major roughness variations of DEMs with different scales and spatial resolutions, but also can indicate subtle small roughness textures in large data. Moreover, V-system roughness can accurately reflect surface features in the fractured structures of terrains.

FIG. 1 shows a method executed by a computer program that improves calculations of surface roughness (R) that map a planetary surface in accordance with an example embodiment.

Block 102 shows calculating a V-system matrix with a size of α×α in an interval [0,1] by the computer system. The V-system matrix is calculated by the integral operation based on the V-system basis function $V_t(x)$, x is a variable in the interval [0,1]. t is a number of each part in the V-system matrix and t=1, 2, . . . , α, α is the total number of the functions in the V-system.

By way of example, the interval [0,1] is divided into a parts.

By way of example, a V-system of degree 1 is computed by the computer system. The V-system of degree 1 is divided into n group and is defined as:

$$V_{1,1}^1(x) = 1, x \in [0, 1]$$

$$V_{1,1}^2(x) = \sqrt{3}(1 - 2x), x \in [0, 1]$$

$$V_{1,2}^1(x) = \begin{cases} \sqrt{3}(1-4x), & x \in \left[0, \frac{1}{2}\right), \\ \sqrt{3}(4x-1), & x \in \left[\frac{1}{2}, 1\right), \end{cases}$$

$$V_{1,2}^2(x) = \begin{cases} 1-6x, & x \in \left[0, \frac{1}{2}\right), \\ 5-6x, & x \in \left[\frac{1}{2}, 1\right). \end{cases}$$

where n<3.

By way of example, the instructions in the computer system when executed further cause the processor to compute a V-system of degree 1, wherein the V-system of degree 1 is divided in n group and is defined as:

$$V_{1,n}^{1,j}(x) = \begin{cases} \sqrt{2^{n-2}}\, V_{1,2}^1\left[2^{n-2}\left(x - \frac{j-1}{2^{n-2}}\right)\right], & x \in \left(\frac{j-1}{2^{n-2}}, \frac{j}{2^{n-2}}\right), \\ 0 & \text{others} \end{cases}$$

-continued $$V_{1,n}^{2,j}(x) = \begin{cases} \sqrt{2^{n-2}}\, V_{1,2}^2\left[2^{n-2}\left(x - \frac{j-1}{2^{n-2}}\right)\right], & x \in \left(\frac{j-1}{2^{n-2}}, \frac{j}{2^{n-2}}\right) \\ 0 & \text{others} \end{cases}$$

where $j = 1, 2, \ldots, 2^{n-2}$, and $n = 3, 4, \ldots$ .

Block 104 shows transforming the V-system matrix into an orthogonal matrix (P(x)) by the computer system.

By way of example, a Gram-Schmidt process is applied to transform the V-system matrix into the orthogonal matrix.

Block 106 shows improving calculations of the surface roughness (R) of the planetary surface by calculating the surface roughness (R) of a digital elevation model (F (y)) generated from data captured from the planetary surface by the computer system. The surface roughness (R) is expressed as:

$$R = P(x) \times F(y) \times P(x)'$$

where P (x) is used as a moving window sliding over the digital elevation model, P(x)' is the conjugate transpose of P(x) and y denotes elevations in the digital elevation model. R is denoted by $\{R(1,1), R(1,2), \ldots, R(i,j), \ldots, R(n,n)\}$, where n is the total number of the functions in the V-system.

To quantify the roughness value ($R_0$), the absolute mean value of R is used as the definition of the V-system roughness:

$$R_0 = \frac{1}{\alpha \times \alpha}\left(\sum_{i=1}^{\alpha}\sum_{j=1}^{\alpha} |R(i,j)| - |R(1,1)|\right)$$

By way of example, the digital elevation model is generated by collecting data of the planetary surface using a remote sensing device.

By way of example, the digital elevation model has a resolution selected from a group consisting of 4, 8 or 16 pixels/degree.

By way of example, the computer system slides a moving window with a size selected from a group consisting of 8×8, 16×16, 32×32, and 64×64 pixels.

Block 108 shows generating a map of the planetary surface based on the surface roughness (R) by the computer system.

By way of example, a two-dimensional roughness map is generated.

In accordance an example embodiment, FIG. 2 to FIG. 6 show basis functions of the V-system of degree k, where k=0, 1, 2, 3. The V-system is marked as $V_{k,n}^{i,j}(x)$. $V_{k,n}^{i,j}(x)$ means the $j^{th}$ function in the $i^{th}$ class of the $n^{th}$ group in V-system of degree k, where k=0, 1, 2, . . . ; n=3, 4, . . . and j=1, 2, . . . , $2^n-2$. The first group (n=1) contains only one class that consists of the first k+1 functions, which are the Legendre polynomials on [0, 1]. It is denoted as $\{V_{k,1}^1(x), V_{k,1}^2(x), \ldots, V_{k,1}^{k+1}(x)\}$. The second group (n=2) also contains only one class consisting of the second k+1 functions, which are the $k^{th}$-order generators. It is denoted as $\{V_{k,2}^2(x), V_{k,2}^2(x), \ldots, V_{k,2}^{k+1}(x)\}$. From the beginning of the third group of the V-system (n=3), each group consists of k+1 classes and each class has $2^{n-2}$ functions.

FIG. 2 shows the first 16 basis functions with k=0. The V-system of degree k=0 is Haar wavelets in one example embodiment.

FIG. 3 shows the first 16 basis functions with k=1 in one example embodiment.

Figure 4:
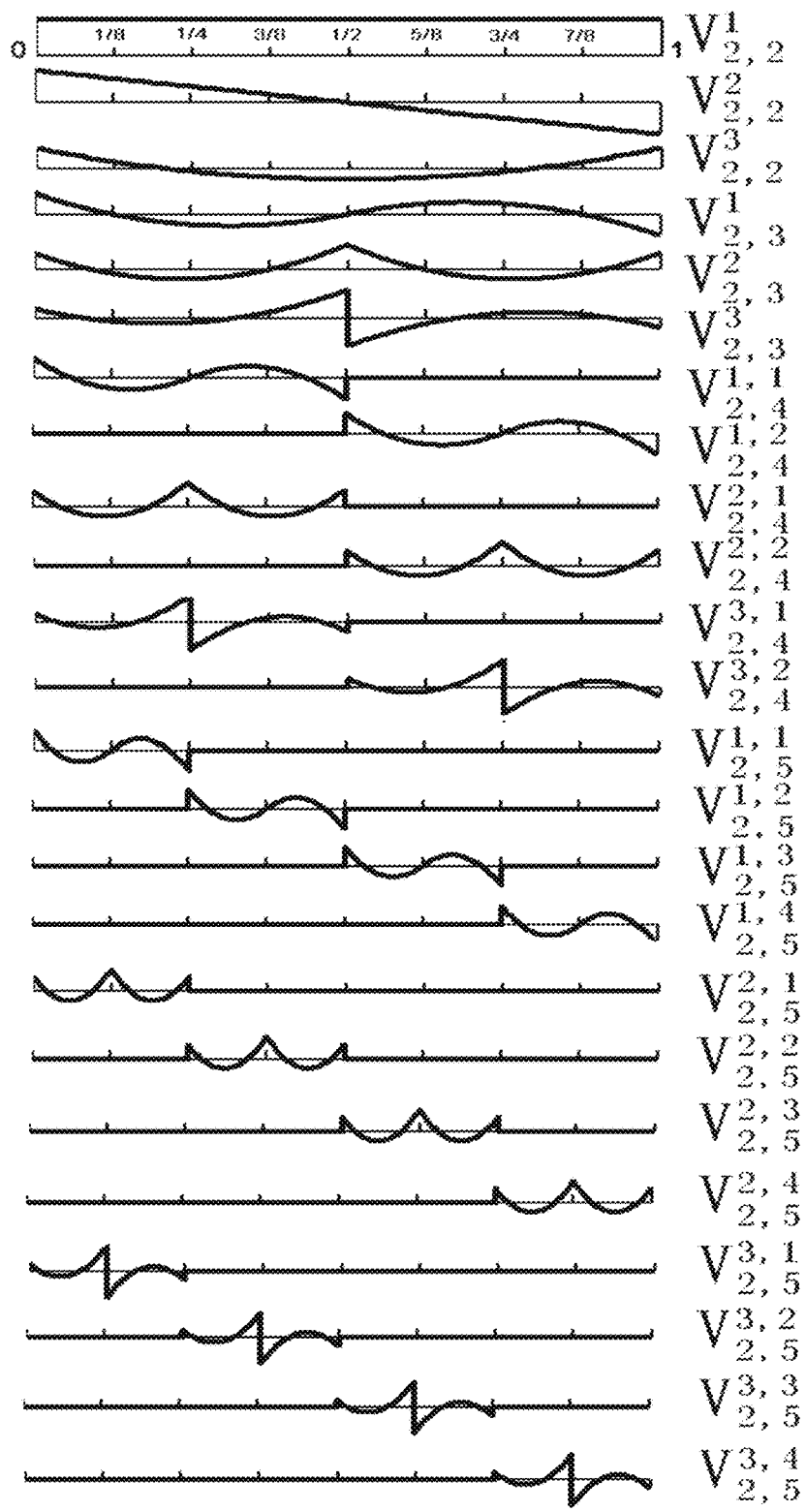
FIG. 4 shows basis functions of the V-system of degree k=2 in accordance with an example embodiment.

FIG. 4 shows the first 24 basis functions with k=2 in one example embodiment.

Figure 5:
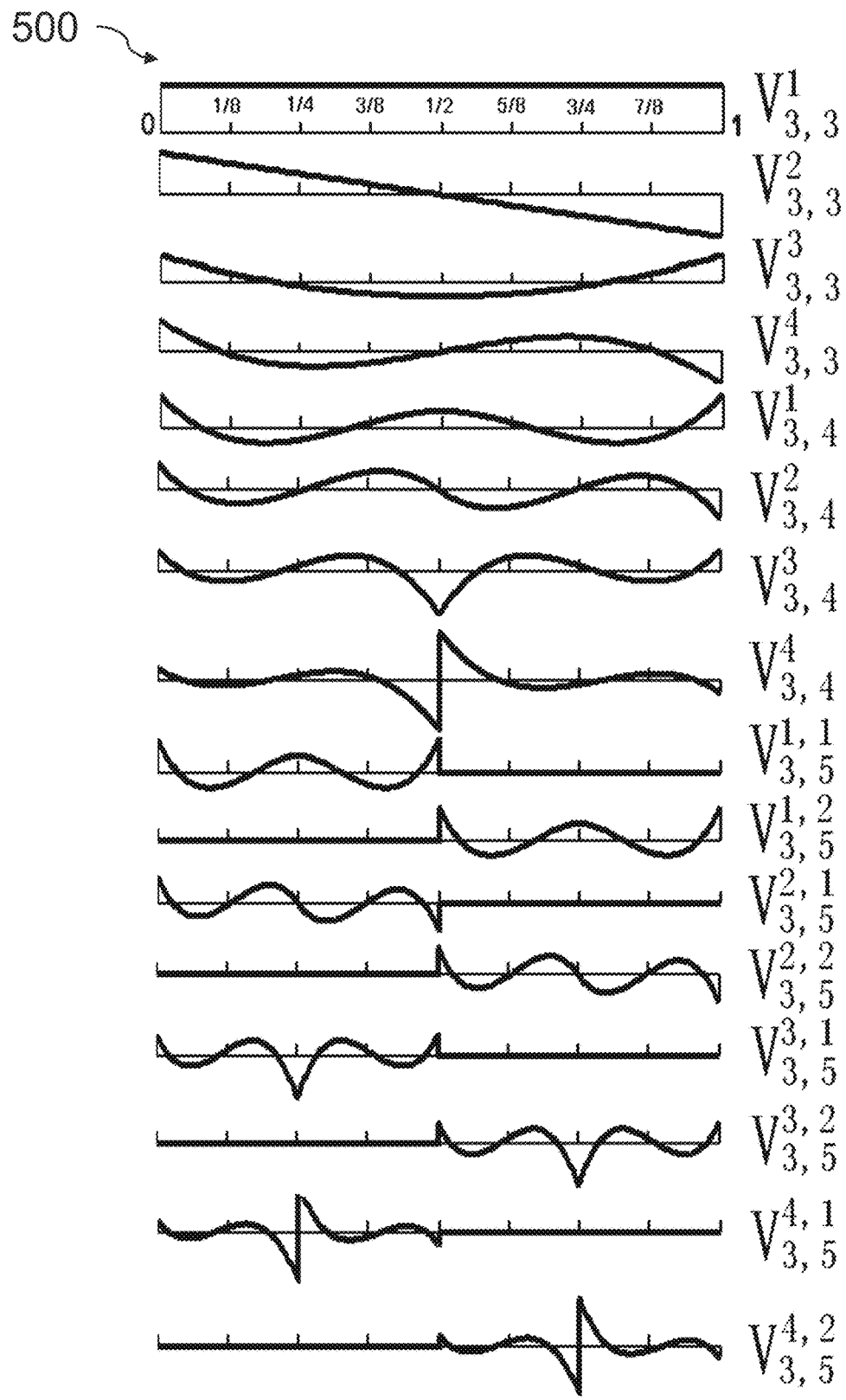
FIG. 5 shows basis functions of the V-system of degree k=3 in accordance with an example embodiment.
Figure 6:
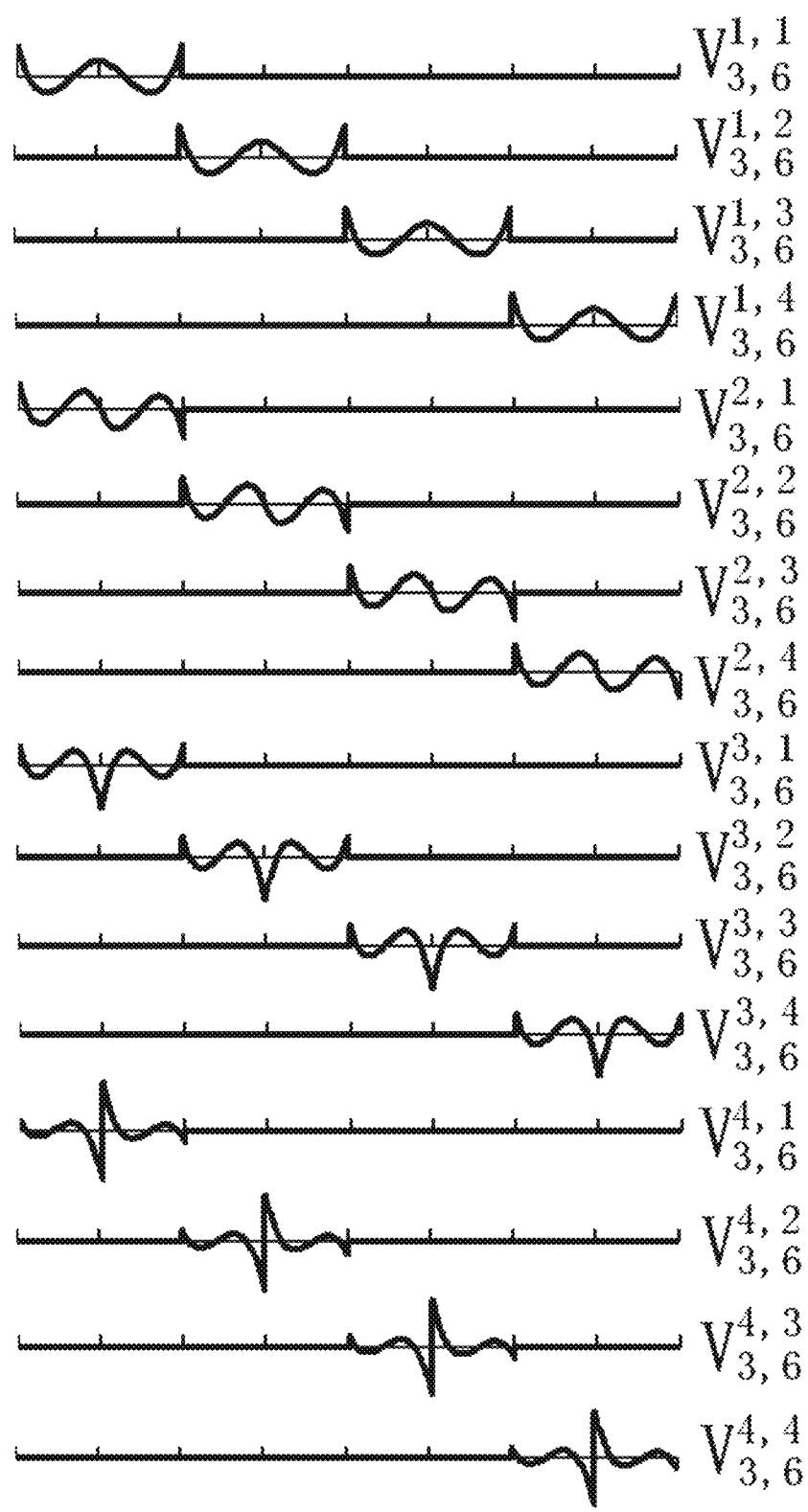
FIG. 6 shows basis functions (continue) of the V-system of degree k=3 in accordance with an example embodiment.

FIG. 5 and FIG. 6 show the first 32 basis functions with k=3 in one example embodiment.

Example embodiment uses V-system for roughness calculation by involving a discrete V-system algorithm. The surface roughness is calculated by using V-system of degree 1 (k=1). The V-system is divided into n groups. Therefore, the V-system of degree 1 is defined as follows. When n<3, $$V_{1,1}^1(x) = 1, x \in [0, 1]$$

$$V_{1,1}^2(x) = \sqrt{3}\,(1 - 2x), x \in [0, 1]$$

$$V_{1,2}^1(x) = \begin{cases} \sqrt{3}(1 - 4x), & x \in \left[0, \frac{1}{2}\right) \\ \sqrt{3}(4x - 1), & x \in \left[\frac{1}{2}, 1\right] \end{cases}$$

$$V_{1,2}^2(x) = \begin{cases} 1 - 6x, & x \in \left[0, \frac{1}{2}\right) \\ 5 - 6x, & x \in \left[\frac{1}{2}, 1\right] \end{cases}$$

By way of example, the instructions in the computer system when executed further cause the processor to compute a V-system of degree 1, wherein the V-system of degree 1 is divided in n group and is defined as:

$$V_{1,n}^{1,j}(x) = \begin{cases} \sqrt{2^{n-2}}\, V_{1,2}^1\left[2^{n-2}\left(x - \frac{j-1}{2^{n-2}}\right)\right], & x \in \left(\frac{j-1}{2^{n-2}}, \frac{j}{2^{n-2}}\right) \\ 0 & \text{others} \end{cases}$$

$$V_{1,n}^{2,j}(x) = \begin{cases} \sqrt{2^{n-2}}\, V_{1,2}^2\left[2^{n-2}\left(x - \frac{j-1}{2^{n-2}}\right)\right], & x \in \left(\frac{j-1}{2^{n-2}}, \frac{j}{2^{n-2}}\right) \\ 0 & \text{others} \end{cases}$$

where $j = 1, 2, \ldots, 2^{n-2}$, and $n = 3, 4, \ldots$ .

FIG. 7 shows a pseudocode 700 for calculating an orthogonal matrix P (x) in one example embodiment. Let $V = \{V_{1,1}^1, V_{1,1}^2, \ldots, V_{1,n}^{1,j}, V_{1,n}^{2,j}\}$ Thus, the V-system of degree 1 can be marked as $V = \{V_1, V_2, \ldots V_n\}$, where n is the total number of the V-system. In order to calculate the V-system matrix with the size of α×α, the interval [0,1] is divided into a parts. Then, the V-system matrix is calculated by the integral operation based on the V-system basis function $V_t(x)$, x is a variable in the interval [0,1]. t is a number of each part in the V-system matrix and t=1, 2, . . . , α, α is the total number of the functions in the V-system. Next, Gram-Schmidt process is applied to transform the V-system matrix (I) into the orthogonal matrix (P(x)). Then, P(x) is used as a moving window to slide over the digital elevation model (DEM). In order to obtain a two-dimensional roughness map, the surface roughness is defined as $$R = P(x) \times F(y) \times P(x)'$$

where P(x)' is the conjugate transpose of P(x).

Figure 9A:
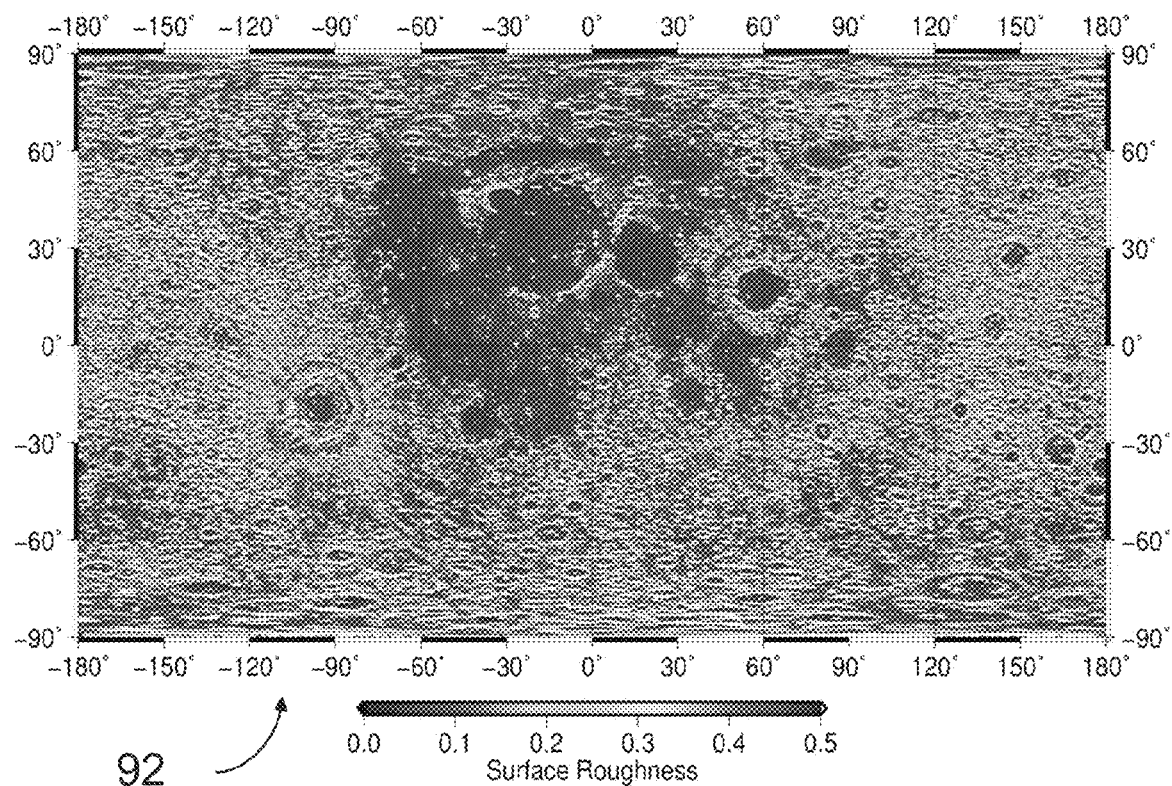
FIG. 9A shows a roughness map with 57 m median absolute slope.
Figure 9B:
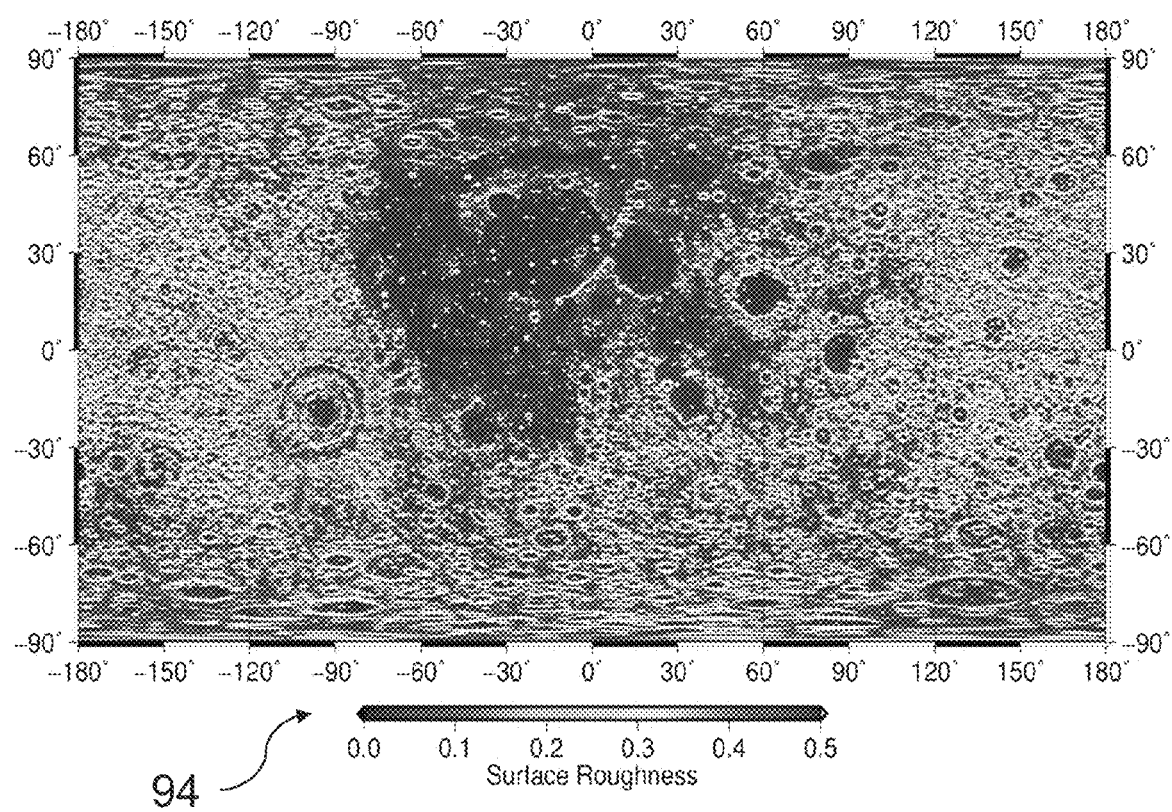
FIG. 9B shows a roughness map generated in accordance with an example embodiment.

In one example embodiment, lunar DEMs are used for roughness calculations. For comparison, FIG. 9A shows a roughness map obtained from conventional method for 57 m median absolute slope (57 m slope), i.e. the point-to-point slopes have been calculated along track at the 57 m baseline. FIG. 9B shows mapping roughness by using V-system with degree k=1 in one example embodiment, where the global DEM called LDEM16 at a resolution of 16 pixels/degree by 16 pixels/degree is used, mapping of global roughness is achieved using 8×8 orthogonal matrix. In order to provide a convenient comparison, all the values in roughness maps are normalized from 0 to 1. In the same range of the normalized roughness contrast (0 to 0.5), the example embodiment show more gradient variations of map values than those in 57 m slope in FIG. 9A. For example, the Orientale basin (19.4° S, 92.8° W) is visible in 57 m slope. The surface roughness map of the example embodiment also show these prominent topographic variations. Moreover, the example embodiment characterizes clearer roughness textures in some typical areas at this scale. On the other hand, the secondary crater chains, which emerge radially from the continuous ejecta deposit in the northwestern of Orientale basin, provides a clearer textural contrast than that in 57 m slope. The floor of Oceanus Procellarum (20.67° N, 56.68° W) appears a cluster of small dots, which has map values nearly 0.3. These roughness contrasts reflect the morphological features of small craters or concave units. Nevertheless, no effective slope contrast can show these roughness variations and many roughness contrasts of small concave units are overlapped by the map values of background.

The statistical measure Root-mean-square-error (RMSE) is used to analyze the differences between the results of the roughness measures of the 57 m slope and the example embodiment.

$$RMSE = \sqrt{\frac{\sum_{i=1,j=1}^{M,N}(R_{i,j}-\overline{R})^2}{M \times N}}$$

where M×N is the total number of pixels in roughness map, R denotes the map value and is the mean value of all the pixels. All the values are from 0 to 1.

FIG. 10 shows the statistical results of surface properties in global lunar surface, while FIG. 11 shows the statistical results of surface properties in nearside terrains (Maria) and farside terrains (Highlands). Higher values demonstrate that the roughness contrasts are easier to characterize the morphological variations. For the whole topography, the textural contrasts of V-system (0.3489) in the example embodiment perform a greater observation than that of 57 m slope (0.3478), which can also be seen in FIGS. 9A and 9B. For Maria (Nearside), although the RMSE of V-system (0.2946) is less than that of 57 m slope (0.3017), the roughness textures of V-system of the example embodiment provides more detailed contrasts in small zones, such as the small dots in Oceanus Procellarum and Mare Imbrium (34.72° N, 14.91° W). For Highlands (Farside), V-system (0.3947) of the example embodiment provides a better identification of geological variations than 57 m slope (0.3688). The reason is that slope is very sensitive to a small proportion of very steep structures in the sample. However, Highlands show complicated, fractured and irregular morphologies. These geological variations cannot be characterized by the steep slopes easily. The example embodiment reflect these features more significantly because it focus upon the waviness in everywhere on the surface.

Figure 12A:
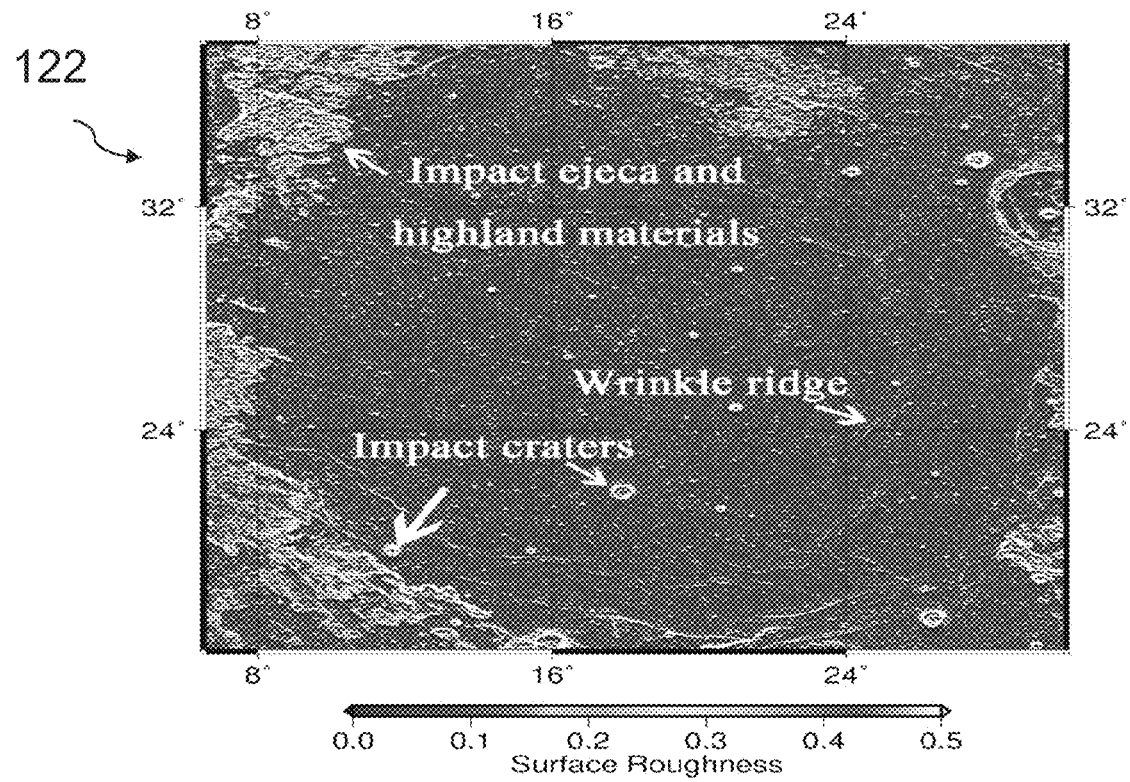
FIG. 12A shows surface roughness calculation of Mare Serenitatis with degree k=1 in accordance with an example embodiment.

FIG. 12A shows surface roughness calculation of Mare Serenitatis with degree k=1 in one example embodiment. The small dots, interior craters and channel networks indicate prominent roughness contrasts in the floor of the Mare. Compare with the surroundings (>0.2), the whole floor of Mare Serenitatis shows low roughness characteristics with a range from 0 to 0.1, which associate with the smooth and flat morphologies of the Mare. The high-resolution map obtained in the example embodiment in FIG. 12A show more details of roughness variations. In the floor of Mare Serenitatis, the calculated map values correlate well with the characteristic features on the Moon. The voluminous volcanic materials (basaltic lava) fill the Serenitatis impact basin forming the relatively flat flooding basalt plain. The basin basalt plain has a relatively flat surface and displays the lowest surface roughness value (purple color in FIG. 12A). Wrinkle ridges are basin-inside contractional landforms resulting from loading of the thick sequences of mare basalts. They are linear features arranged in a basin-concentric pattern, and commonly have a flat top and both of their sides are relatively steep. On the surface roughness map, they correspond to blue and green color for their flat tops and steep sides, respectively. The higher surface roughness values (blue to white color in FIG. 12A) are exhibited in the crater rim regions and basin-outer marginal zones. This is because these areas have a relatively high terrain fluctuation caused by impact effect.

Figure 12B:
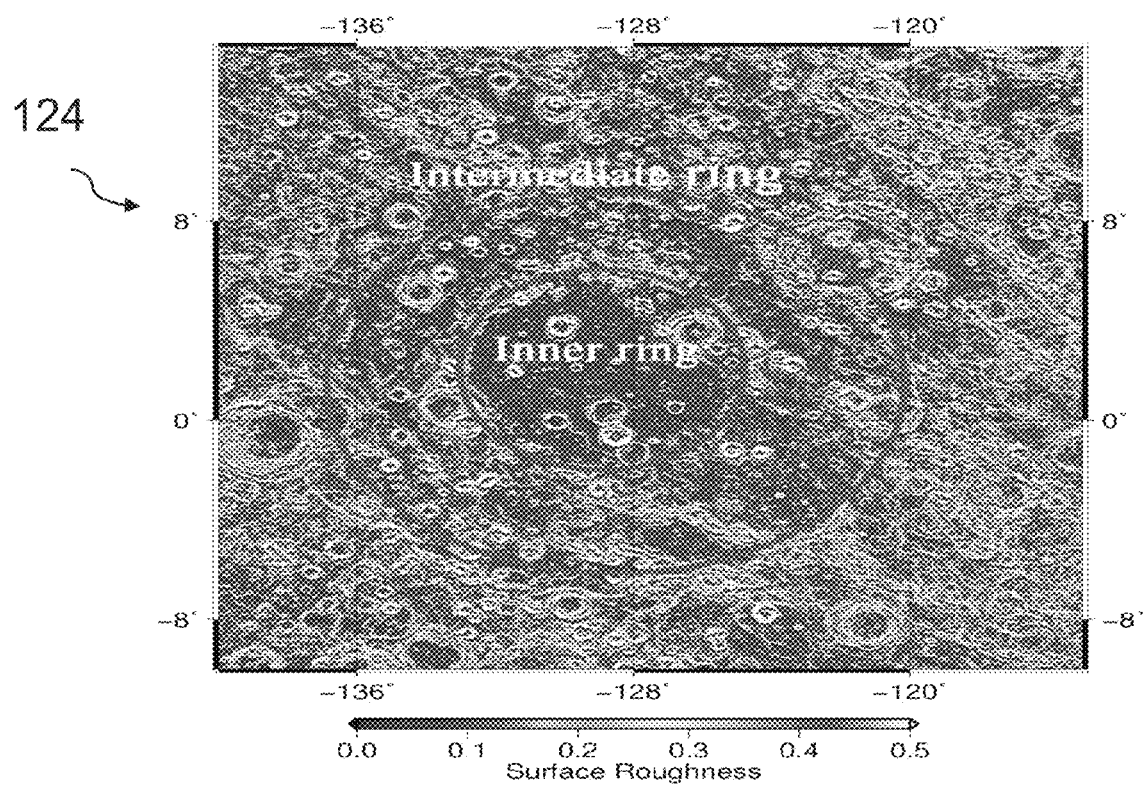
FIG. 12B shows surface roughness calculation of Herzsprung basin with degree k=1 in accordance with an example embodiment.

FIG. 12B shows V-system roughness calculation of Herzsprung basin with degree k=1 in one example embodiment. Most of roughness contrasts are characterized by the rough deposits on crater rims. The center floor of this basin has lower map values than those in other units. Generally, highlands show opposite morphologies of Mare. As an example of highlands terrains, the Hertzsprung basin is a multi-ring basin having three rings clearly seen from topography and gravity signature. The inner ring and the intermediate ring are distinct from surrounding mare surfaces on their both sides, basing on the color difference indicated in FIG. 12B. The blue color regions in the surface roughness map between the inner and intermediate rings of the Hertzsprung basin are in correspond to lava patches with relatively flat surface.

Figure 13A:
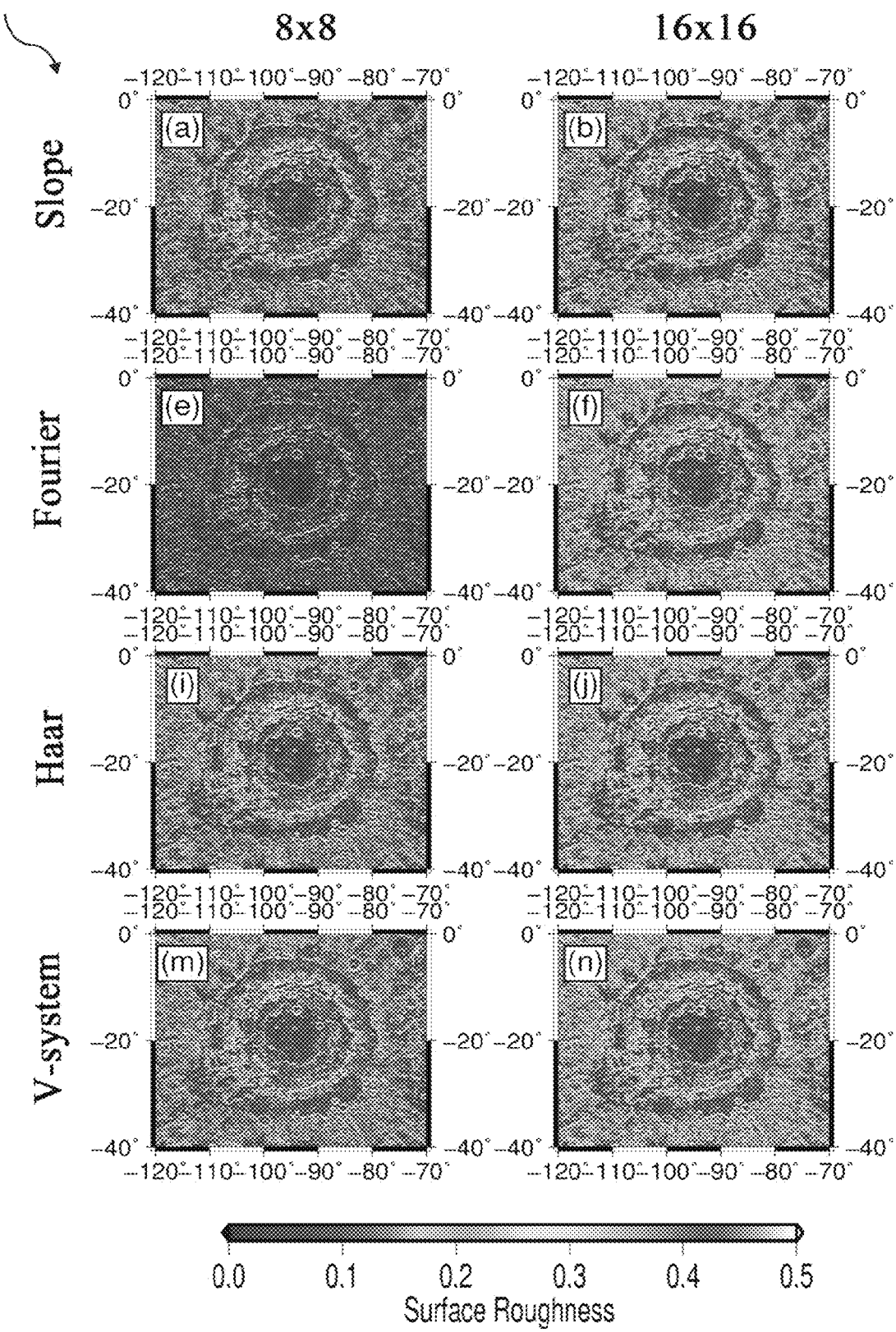
FIG. 13A shows the surface roughness map generated by different methods (Slope, Fourier, Haar and V-system in accordance with an example embodiment) using moving window sizes 8×8 and 16×16.
Figure 13B:
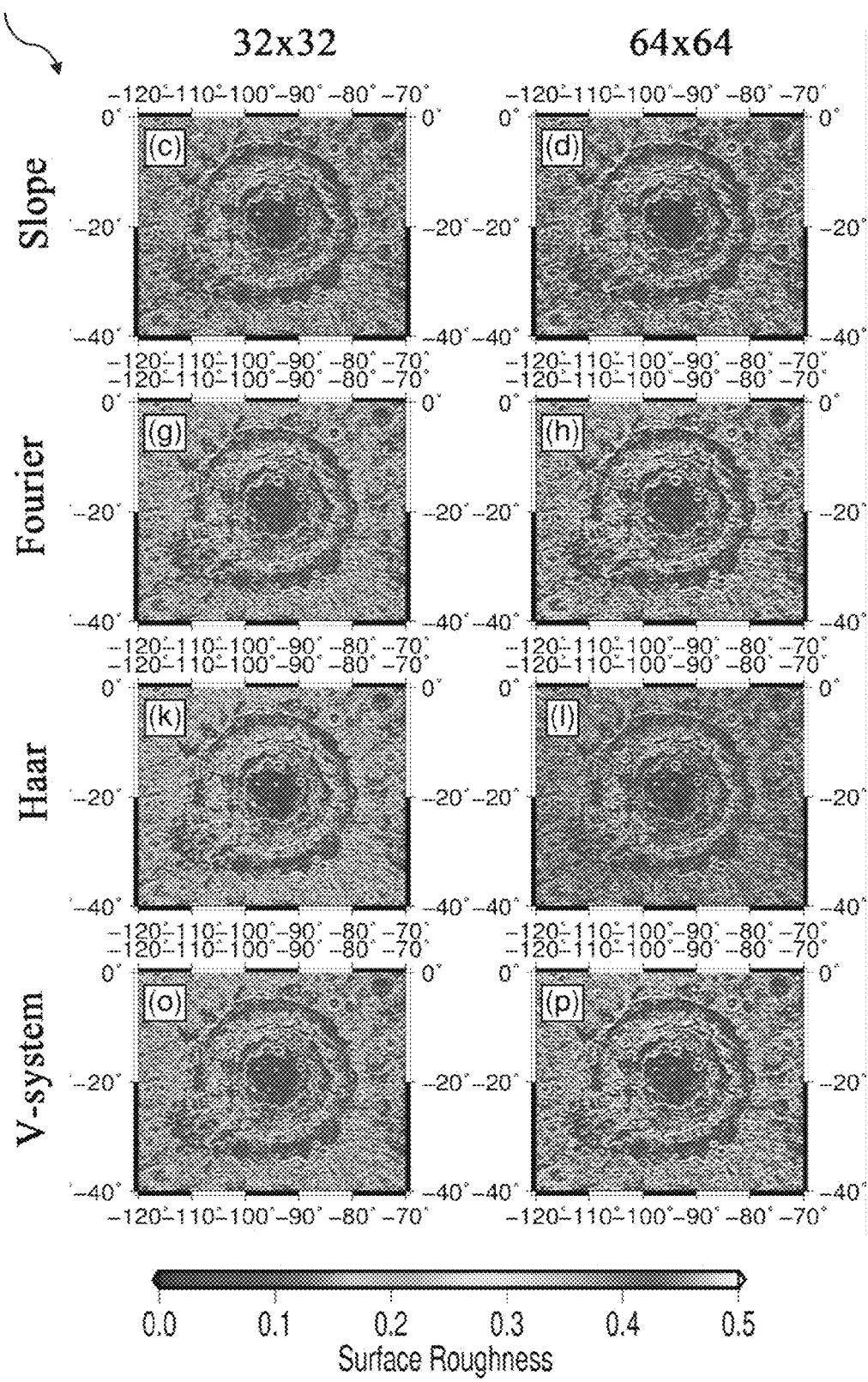
FIG. 13B shows the surface roughness map generated by different methods (Slope, Fourier, Haar and method in accordance with an example embodiment) using moving window sizes 32×32 and 64×64.

Scale dependence is the fundamental properties of surface roughness and utilized to analyze the reliabilities and abilities of roughness measures. As an example for roughness calculation, the Orientale basin (19° S, 92.8° W) is extracted from high-resolution DEM. In order to indicate the scale-dependent behavior of the example embodiment, other three roughness measures (slope, Fourier transform and Haar wavelet) are utilized to provide a comparative discussion with the example embodiment using V-system as shown in FIGS. 13A and 13B. Furthermore, the roughness parameters are calculated in moving windows with sizes of 8×8, 16×16, 32×32 and 64×64 pixels for multiscale analysis of surface roughness. In order to discuss the scale effect of the V-system roughness in the example embodiment in the Orientale basin, the three ring structures found within Cordillera Ring (CR): the Outer Rook Ring (ORR), the Inner Rook Ring (IRR) and the Inner Ring (IR). The structure of Center Floor (CF) is also analyzed. The impact sheet stretches out the ORR and show prominent roughness variations in FIGS. 13A and 13B in all the sizes of moving windows from 8×8 to 64×64. Following the increase of moving windows, the roughness contrasts of impact sheet are clearer outside of CR. Between ORR and CR, roughness variations in the Montes Rock Formation are characterized with map values from purple to light blue color. In all the scales, the roughness variations in IRR are stable with values from 0.25 to 0.35, which correspond with that the morphology of IRR is analogous to a peak ring. The other stable roughness variations can be seen in CF. The purple regions in CF corresponds to the inner depression of the mare. Between IR and IRR, the light blue regions associate with the morphological variations of Maunder formation. As the changes of moving windows, more types of colors can be seen in Maunder formation. This phenomenon is interpreted that example embodiment has multiresolution properties and there are more detailed roughness textures at a large scale.

To compare with other roughness measures, the example embodiment show more reasonable scale-dependent behaviors for the following reasons. First, the roughness contrasts are strong enough to reflect the morphological variations in the inner depression, Maunder Formation and the impact sheet outside of CR with the moving window sizes 8×8. Haar wavelet can also characterize these variations. However, Fourier roughness fails to indicate the prominent roughness characteristics in these regions and slopes show less strong roughness contrasts than those in Haar wavelet and the example embodiment. Moreover, when the moving window size increases, slope ignores the morphological variations of small units in flat plain by using low map values (purple color) to overlap these regions. In the moving window with size 16×16, the roughness textures of V-system are also similar as those in Haar wavelet. However, following the changes of moving windows (from 32×32 to 64×64), the roughness textures of Haar wavelets are distorted. Some small and typical roughness variations are overlapped by the major and prominent roughness contrasts. Haar wavelet is interpreted to only use the constant (FIG. 9A) for roughness calculation. As the expansion of Haar wavelets, V-system of example embodiment reserves the roughness textures affected by more different types of geological units.

Figure 14A:
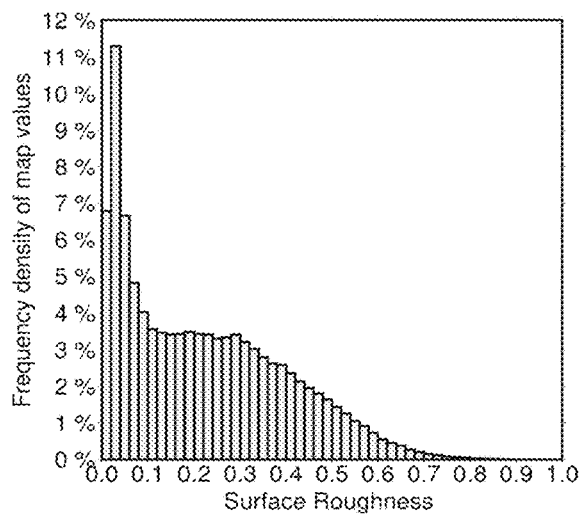
FIG. 14A shows frequency density of roughness values in Maria based on the DEMs at spatial resolution of 4 pixels/degree and the calculated region is 8×8 pixels in accordance with an example embodiment.
Figure 14B:
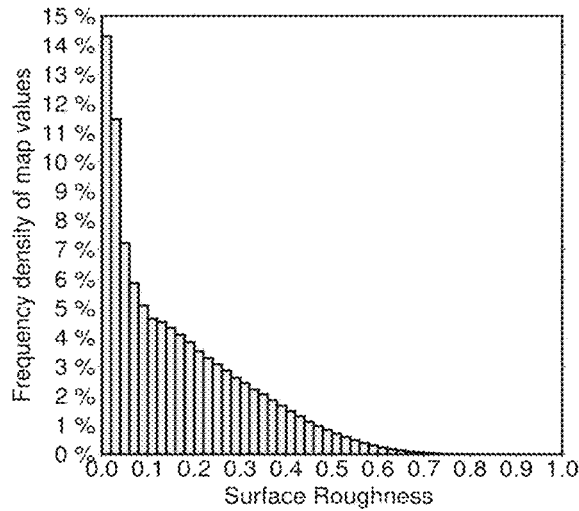
FIG. 14B shows frequency density of roughness values in Maria based on the DEMs at spatial resolution of 8 pixels/degree and the calculated region is 8×8 pixels in accordance with an example embodiment.
Figure 14C:
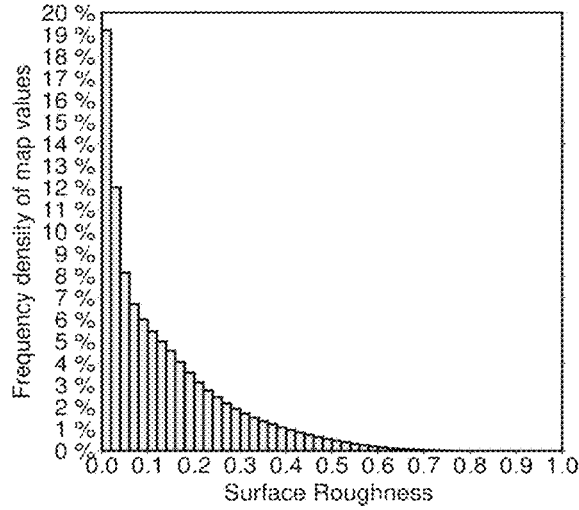
FIG. 14C shows frequency density of roughness values in Maria based on the DEMs at spatial resolution of 16 pixels/degree and the calculated region is 8×8 pixels in accordance with an example embodiment.
Figure 15A:
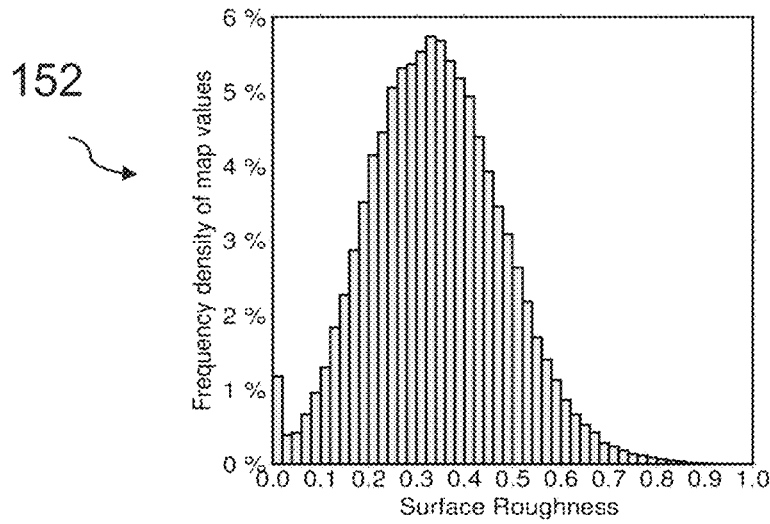
FIG. 15A shows frequency density of roughness values in Highlands based on the DEMs at spatial resolution of 4 pixels/degree and the calculated region is 8×8 pixels in accordance with an example embodiment.
Figure 15B:
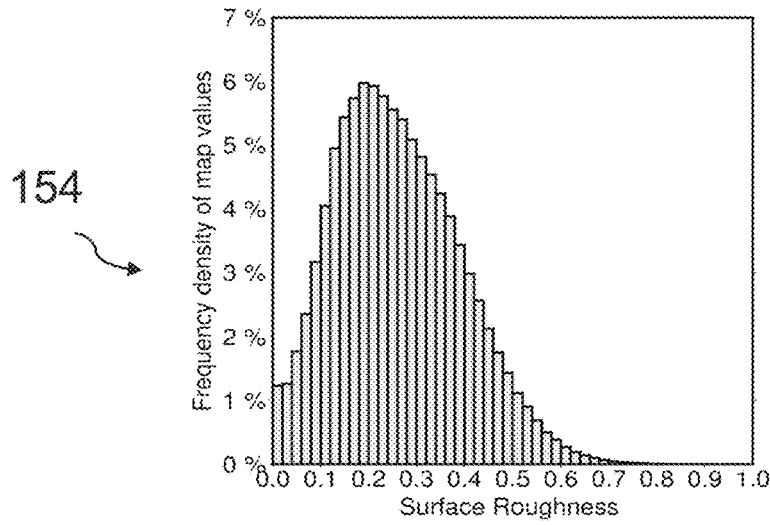
FIG. 15B shows frequency density of roughness values in Highlands based on the DEMs at spatial resolution of 8 pixels/degree and the calculated region is 8×8 pixels in accordance with an example embodiment.
Figure 15C:
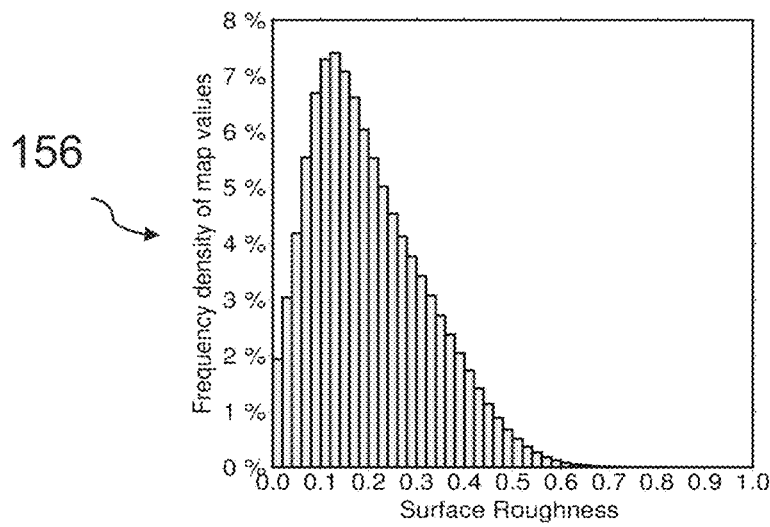
FIG. 15C shows frequency density of roughness values in Highlands based on the DEMs at spatial resolution of 16 pixels/degree and the calculated region is 8×8 pixels in accordance with an example embodiment.

In order to demonstrate the reliability and practicability of V-system roughness in DEMs with multiresolution in example embodiment, FIGS. 14A to 14C show the histogram of V-system roughness in Maria and FIGS. 15A to 15C show the histogram of V-system roughness in Highlands based on DEMs with different resolutions (4, 8 and 16 pixels/degree) are calculated. The calculated region is 8×8 pixels. Furthermore, the roughness values are quantified by using RMSE and Median values. For convenient comparison, all the roughness values are normalized from 0 to 1. The example embodiment satisfies the basics of surface roughness. First, most the roughness values of Maria are lower than those of Highlands. Second, following the increase of DEM's resolution, the roughness contrasts of major regions become smaller and smaller because the data in the fixed calculated regions can characterize less information of terrains. Third, FIG. 11 illustrates that Highlands are rougher than Maria in all the DEMs. This result means that the V-system roughness is a stable roughness measure. The stability of roughness measure is very important because the roughness of geological units over a large data should be similar as the results in a small subset of the same data.

The example embodiment provides a reasonable comparison between roughness variations in Maria and Highlands. To observe the frequency density of map values in FIGS. 14A to 14C and FIGS. 15A to 15C, most of roughness values vary from 0.01 to 0.02 based on the DEM with a resolution of 4 pixels/degree show in FIG. 14A. Following the increase of the spatial resolutions, the percentages of the roughness values from 0 to 0.01 increase 7% as shown in FIG. 14B and 12% as shown in FIG. 14C, respectively. The same intervals of roughness values in Highlands are also increasing. Based on the DEM at a resolution of 4 pixels/degree, only 1% percentage of roughness values can be seen from 0 to 0.01. After that, the percentage increases slowly and reaches a peak with a value of 2% at the spatial resolution of 8 pixels/degree. As a conclusion, this result can associate with the fact that the roughness variations in Highlands are much stronger than those in Maria.

FIG. 16 shows a computer system that executes and reduces central processing unit (CPU) time to process instructions that generates a surface roughness map in one example embodiment. The computer system includes one or more of a server 1310, electronic device 1410 and database 1110 in communication via one or more networks 1210.

The server 1310 includes a processor or processing unit 1312, a memory 1314, a display 1316, and improved map generator 1318.

The electronic device 1410 includes one or more of a processor or processing unit 1412, memory 1414, display 1416 and improved map generator 1418. Examples of an electronic device include, but are not limited to, laptop computers, desktop computers, tablet computers, handheld portable, electronic devices (HPEDs), and other portable and non-portable electronic devices.

The database 1110 includes electronic storage or memory and can store data or other information to assist in executing example embodiments.

The network(s) 1210 can include one or more of a wired network or wireless network, such as the internet, cellular network, etc.

The processor, memory, and/or improved map generator in the server 1310 and/or electronic device 1410 execute methods in accordance with example embodiments. The improved map generator can include software and/or specialized hardware to execute example embodiments.

The processor unit includes a processor (such as a central processing unit, CPU, microprocessor, microcontrollers, field programmable gate array (FPGA), application-specific integrated circuit (ASIC), etc.) for controlling the overall operation of memory (such as random access memory (RAM) for temporary data storage, read only memory (ROM) for permanent data storage, and firmware). The processing unit and improved map generator communicate with each other and memory and perform operations and tasks that implement one or more blocks of the flow diagrams discussed herein. The memory, for example, stores applications, data, programs, algorithms (including software to implement or assist in implementing example embodiments) and other data.

In some example embodiments, the methods illustrated herein and data and instructions associated therewith are stored in respective storage devices, which are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

The methods in accordance with example embodiments are provided as examples, and examples from one method should not be construed to limit examples from another method. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

As used herein, "central processing unit time" or "CPU time" is an amount of time for a processor to execute instructions of a computer program.

As used herein, "DEM" or "Digital elevation model" is a digital model or 3D representation of a terrain's surface.

As used herein, "orthogonality" has following definition. By using integral calculus, it is common to use the following to define the inner product of two functions $f$ and $g$.

$$<f,g> = \int_a^b f(x)g(x)dx,$$

$f$ and $g$ are orthogonal (with respect to this inner product) if the value of this integral is zero:

$$\int_a^b f(x)g(x)dx = 0.$$

The invention claimed is:

1. A method executed by a computer system that improves calculations of surface roughness (R) that map a planetary surface, the method comprising:
  calculating, by the computer system, a V-system matrix with a size of $\alpha \times \alpha$ in an interval [0,1] such that the interval [0,1] is divided into a parts, wherein the V-system matrix is calculated by an integral operation based on a V-system basis function $V_t(x)$, x is a variable in the interval [0,1], t is a number of each part in the V-system matrix and t=1, 2, . . . , $\alpha$, $\alpha$ is the total number of the functions in the V-system;
  transforming, by the computer system, the V-system matrix into an orthogonal matrix (P(x));
  improving calculations of the surface roughness (R) of the planetary surface by calculating the surface roughness (R) of a digital elevation model (F (y)) generated from data captured from the planetary surface, wherein (R) is expressed as:

$$R = P(x) \times F(y) \times P(x)'$$

wherein P (x) is a moving window sliding over the digital elevation model, P(x)' is the conjugate transpose of P(x) and y denotes elevations in the digital elevation model; and
  generating, by the computer system and based on the surface roughness (R), a map of the planetary surface.

2. The method of claim 1 further comprising:
  generating, by the computer system, the digital elevation model by collecting data of the planetary surface using a remote sensing device.

3. The method of claim 1 further comprising:
  applying, by the computer system, a Gram-Schmidt process to transform the V-system matrix into the orthogonal matrix.

4. The method of claim 1 further comprising:
  computing, by the computer system, a V-system of degree 1, wherein the V-system of degree 1 is divided into n group and is defined as:

$$V_{1,1}^1(x) = 1, x \in [0, 1]$$

$$V_{1,1}^2(x) = \sqrt{3}(1-2x), x \in [0, 1]$$

$$V_{1,2}^1(x) = \begin{cases} \sqrt{3}(1-4x), & x \in \left[0, \frac{1}{2}\right), \\ \sqrt{3}(4x-1), & x \in \left[\frac{1}{2}, 1\right], \end{cases}$$

$$V_{1,2}^2(x) = \begin{cases} 1-6x, & x \in \left[0, \frac{1}{2}\right), \\ 5-6x, & x \in \left[\frac{1}{2}, 1\right]. \end{cases}$$

where n<3, $$V_{1,n}^{1,j}(x) = \begin{cases} \sqrt{2^{n-2}}\, V_{1,2}^1\left[2^{n-2}\left(x - \frac{j-1}{2^{n-2}}\right)\right], & x \in \left(\frac{j-1}{2^{n-2}}, \frac{j}{2^{n-2}}\right), \\ 0 & \text{others} \end{cases}$$

$$V_{1,n}^{2,j}(x) = \begin{cases} \sqrt{2^{n-2}}\, V_{1,2}^2\left[2^{n-2}\left(x - \frac{j-1}{2^{n-2}}\right)\right], & x \in \left(\frac{j-1}{2^{n-2}}, \frac{j}{2^{n-2}}\right), \\ 0 & \text{others} \end{cases}$$

where $j = 1, 2, \ldots, 2^{n-2}$, and $n = 3, 4, \ldots$ .

5. The method of claim 1 further comprising:
  calculating, by the computer system, an absolute mean value of R by $$R_0 = \frac{1}{\alpha \times \alpha}\left(\sum_{i=1}^{\alpha}\sum_{j=1}^{\alpha}|R(i,j)| - |R(1,1)|\right),$$

where R is denoted by {R(1,1), R(1,2), . . . , R(i,j), . . . , R(n,n)}, n is the total number of the functions in the V-system.

6. The method of claim 1 further comprising:
  sliding, by the computer system, the moving window with a size selected from a group consisting of 8×8, 16×16, 32×32, and 64×64 pixels.

7. The method of claim 1, wherein the digital elevation model has a resolution selected from a group consisting of 4, 8 or 16 pixels/degree.

8. A computer system that generates an improved map showing surface roughness of a planetary surface, the computer system comprising:
  a processor;
  a display;
  a non-transitory computer-readable medium having stored therein instructions that when executed cause the processor to:
    calculate a V-system matrix with a size of $\alpha \times \alpha$ in an interval [0,1] such that the interval [0,1] is divided into a parts, wherein the V-system matrix is calculated by the integral operation based on the V-system basis function $V_t(x)$, x is a variable in the interval [0,1], t is a number of each part in the V-system matrix and t=1, 2, ..., α, α is the total number of the functions in the V-system;

transform the V-system matrix into an orthogonal matrix (P(x));

reduce CPU time by calculating a surface roughness (R) for a digital elevation model (F (y)), wherein (R) is expressed as:

$$R = P(x) \times F(y) \times P(x)'$$

where P (x) is a moving window sliding over the digital elevation model, P(x)' is the conjugate transpose of P(x) and y denotes elevations in the digital elevation model; and generate the improved map by characterizing map values with color on the display based on the surface roughness (R).

9. The computer system of 8 further comprising:
a mapper that connects with a remote sensing device, wherein the mapper collects data of a terrain's surface from the remote sensing device and generates the digital elevation model.

10. The computer system of 8, wherein the V-system matrix is transformed into the orthogonal matrix by a Gram-Schmidt process.

11. The computer system of 8, wherein the instructions when executed further cause the processor to compute a V-system of degree 1, wherein the V-system of degree 1 is divided in n group and is defined as:

$$V_{1,1}^1(x) = 1, x \in [0, 1]$$

$$V_{1,1}^2(x) = \sqrt{3}\,(1 - 2x), x \in [0, 1]$$

$$V_{1,2}^1(x) = \begin{cases} \sqrt{3}\,(1 - 4x), & x \in \left[0, \tfrac{1}{2}\right), \\ \sqrt{3}\,(4x - 1), & x \in \left[\tfrac{1}{2}, 1\right], \end{cases}$$

$$V_{1,2}^2(x) = \begin{cases} 1 - 6x, & x \in \left[0, \tfrac{1}{2}\right), \\ 5 - 6x, & x \in \left[\tfrac{1}{2}, 1\right]. \end{cases}$$

where n<3, $$V_{1,n}^{1,j}(x) = \begin{cases} \sqrt{2^{n-2}}\, V_{1,2}^1\!\left[2^{n-2}\!\left(x - \tfrac{j-1}{2^{n-2}}\right)\right], & x \in \left(\tfrac{j-1}{2^{n-2}}, \tfrac{j}{2^{n-2}}\right), \\ 0 & \text{others} \end{cases},$$

$$V_{1,n}^{2,j}(x) = \begin{cases} \sqrt{2^{n-2}}\, V_{1,2}^2\!\left[2^{n-2}\!\left(x - \tfrac{j-1}{2^{n-2}}\right)\right], & x \in \left(\tfrac{j-1}{2^{n-2}}, \tfrac{j}{2^{n-2}}\right), \\ 0 & \text{others} \end{cases},$$

where $j = 1, 2, \ldots, 2^{n-2}$, and $n = 3, 4, \ldots$ .

12. The method of claim 8 further comprising:
calculating, by the computer system, an absolute mean value of R by $$R_0 = \frac{1}{\alpha \times \alpha}\left(\sum_{i=1}^{\alpha}\sum_{j=1}^{\alpha} |R(i,j)| - |R(1,1)|\right),$$

where R is denoted by {R(1,1), R(1,2), ..., R(i,j), ..., R(n,n)}, n is the total number of the functions in the V-system.

13. The computer system of 8, wherein the moving window have a size selected from a group consisting of 8×8, 16×16, 32×32, and 64×64 pixels.

14. The computer system of 8, wherein the digital elevation model has a resolution selected from a group consisting of 4, 8 and 16 pixels/degree.

15. A method that generates an improved map showing surface roughness of a planetary surface, the method comprising:

calculating, by a computer, a V-system matrix with a size of α×α in an interval [0,1] such that the interval [0,1] is divided into α parts, wherein the V-system matrix is calculated by the integral operation based on the V-system basis function $V_t(x)$, x is a variable in the interval [0,1], t is a number of each part in the V-system matrix and t=1, 2, ..., α, α is the total number of the functions in the V-system;

transforming, by the computer system, the V-system matrix into an orthogonal matrix (P(x)); and generating the improved map of the surface roughness of the planetary surface by calculating a surface roughness (R) of a digital elevation model (F (y)) generated from data captured from the planetary surface, wherein (R) is expressed as:

$$R = P(x) \times F(y) \times P(x)'$$

where P (x) is used as a moving window sliding over the digital elevation model, P(x)' is the conjugate transpose of P(x) and y denotes elevations in the digital elevation model.

16. The method of claim 15 further comprising:
generating, by the computer system, the digital elevation model by collecting data of a planetary surface using a remote sensing device.

17. The method of claim 15 further comprising:
applying, by the computer system, a Gram-Schmidt process to transform the V-system matrix into the orthogonal matrix.

18. The method of claim 15 further comprising:
computing, by the computer system, a V-system of degree 1, wherein the V-system of degree 1 is divided into n group and is defined as:

$$V_{1,1}^1(x) = 1, x \in [0, 1]$$

$$V_{1,1}^2(x) = \sqrt{3}\,(1 - 2x), x \in [0, 1]$$

$$V_{1,2}^1(x) = \begin{cases} \sqrt{3}\,(1 - 4x), & x \in \left[0, \tfrac{1}{2}\right), \\ \sqrt{3}\,(4x - 1), & x \in \left[\tfrac{1}{2}, 1\right], \end{cases}$$

$$V_{1,2}^2(x) = \begin{cases} 1 - 6x, & x \in \left[0, \tfrac{1}{2}\right), \\ 5 - 6x, & x \in \left[\tfrac{1}{2}, 1\right]. \end{cases}$$

where n<3, $$V_{1,n}^{1,j}(x) = \begin{cases} \sqrt{2^{n-2}}\, V_{1,2}^1\!\left[2^{n-2}\!\left(x - \tfrac{j-1}{2^{n-2}}\right)\right], & x \in \left(\tfrac{j-1}{2^{n-2}}, \tfrac{j}{2^{n-2}}\right), \\ 0 & \text{others} \end{cases},$$

$$V_{1,n}^{2,j}(x) = \begin{cases} \sqrt{2^{n-2}}\, V_{1,2}^2\left[2^{n-2}\left(x - \frac{j-1}{2^{n-2}}\right)\right], & x \in \left(\frac{j-1}{2^{n-2}}, \frac{j}{2^{n-2}}\right), \\ 0 & \text{others} \end{cases}$$

where $j = 1, 2, \ldots, 2^{n-2}$, and $n = 3, 4, \ldots$ .

19. The method of claim 15 further comprising:
calculating, by the computer system, an absolute mean value of R by $$R_0 = \frac{1}{\alpha \times \alpha}\left(\sum_{i=1}^{\alpha}\sum_{j=1}^{\alpha} |R(i,j)| - |R(1,1)|\right),$$

where R is denoted by $\{R(1,1), R(1,2), \ldots, R(i,j), \ldots, R(n,n)\}$, n is the total number of the functions in the V-system.

20. The method of claim 15 further comprising:
sliding, by the computer system, the moving window with a size selected from a group consisting of 8×8, 16×16, 32×32, and 64×64 pixels.

* * * * *